No. 718,186. PATENTED JAN. 13, 1903.
A. ASHWORTH.
VENTILATING AND CHIMNEY COWL.
APPLICATION FILED JUNE 30, 1902.

NO MODEL.

Witnesses:

Inventor
Arthur Ashworth

UNITED STATES PATENT OFFICE.

ARTHUR ASHWORTH, OF BURY, ENGLAND.

VENTILATING AND CHIMNEY COWL.

SPECIFICATION forming part of Letters Patent No. 718,186, dated January 13, 1903.

Application filed June 30, 1902. Serial No. 113,719. (No model.)

*To all whom it may concern:*

Be it known that I, ARTHUR ASHWORTH, a subject of the King of Great Britain and Ireland, residing at Bury, in the county of Lancaster, England, have invented new and useful Improvements in Cowls and Hoods for Ventilating-Shafts and Chimney-Tops, of which the following is a specification.

This invention relates to those cowls and hoods for ventilating-shafts and chimney-tops which are capable of being turned either by the action of the wind, by hand, or by other means, so as to bring their exits in the direction toward which the wind is blowing. The object of my invention is to increase the updraft in the ventilating-shafts and chimneys to which the hoods or cowls are applied, and for this purpose I make use of a funnel-shaped attachment to the cowl or hood, such as has already been employed without much material advantage. This funnel-shaped attachment has its larger diameter facing the wind and its hollow stem pointing horizontally in the direction of the exit from the cowl or hood. Instead, however, of constructing the apparatus in the usual manner I so construct it that the produced axis of the stem passes below the center of the exit, and I further depart from the existing construction in the following important particulars: In the stem part of the attachment I construct a number of radial or approximately radial blades, the outer edges of which are attached to or are in contact with the inside of the stem. The whole or the majority of these blades are not parallel with the axis of the stem, but curve with a diminishing screw-pitch, so that when the wind blows through the stem there is imparted to the wind a whirling or cyclonic motion, which, however, can be modified by making one or more of the blades in the lower half of the stem straight instead of being curved, as I find that thereby an increased efficiency is generally obtained. At the windward end of the stem there is fixed a cone, with its apex in the direction from which the wind arrives, for the purpose of directing the wind into the channels between the blades, or the wind may be limited to these channels by other means.

The hood or cowl turns upon the upper end of a fixed spindle and has its lower edge dipping into an annular channel formed upon the upper part of the shaft or tube to which the cowl or hood is applied. This channel is supplied with petroleum-oil or with other suitable non-volatile fluid, so as to form a liquid seal between the parts.

I will more particularly describe my said invention with reference to the accompanying drawings, in which—

Figure 1:
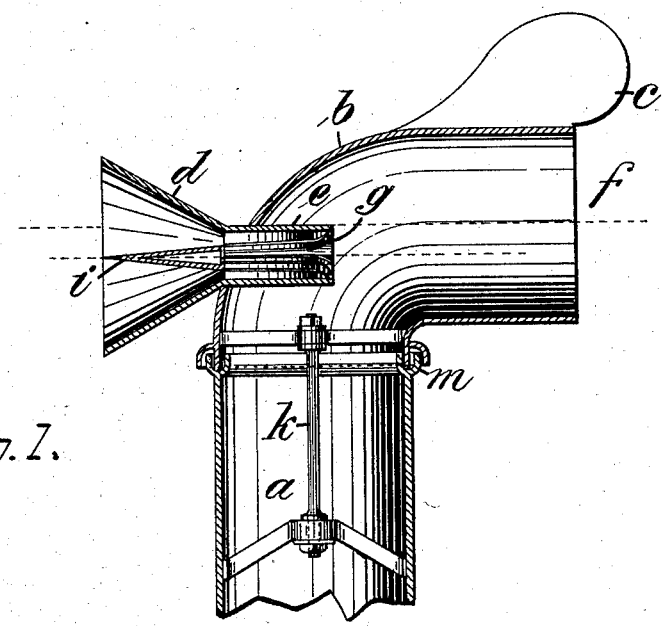
Figure 2:
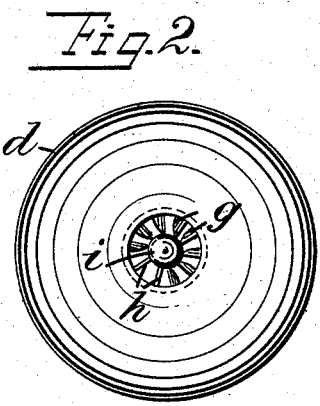
Figure 3:
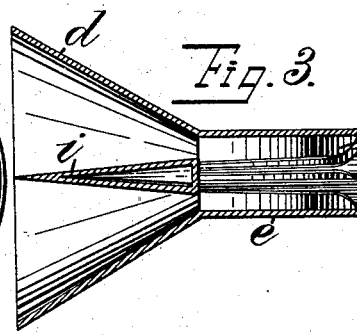

Figure 1 shows a vertical section of the cowl or hood on a ventilating-shaft or chimney-top. The funnel-shaped part is separately illustrated by Fig. 2, which shows an end elevation as seen from the back; Fig. 3, a vertical longitudinal section, and Fig. 4 an end view as seen from the front.

Figure 4:

In the drawings, $a$ indicates the ventilating-shaft or chimney-top, as the case may be; $b$, the cowl or hood; $c$, the vane, which is omitted when the cowl is not to be turned by the wind; $d$, the conical, and $e$ the stem, parts of the funnel-shaped attachment. The produced axis of the stem $e$ passes below the center of the exit $f$. The blades $g$, hereinbefore referred to, are generally eight or ten in number, but a less or a greater number may be employed, as will be governed by the dimensions of the apparatus. As shown by the drawings, the blades are secured to the inner surface of the stem and have such a width that there is a clear vacant space between their inner edges. All the blades in the upper segment of the stem and some (or all) of those in the lower segment have a curvature longitudinally which increases slightly toward the exit $f$. The remaining blades $h$ (if any) are radial and straight, as seen in Figs. 2 and 4. I find that two such straight blades positioned as shown in the figures give the best average result. Nevertheless they may be otherwise positioned in the lower segment of the part $e$, and there may be only one or more than two of them in particular cases without much loss of efficiency. It has also been found advantageous to permit the outer ends of the blades nearer to the exit $f$ to project beyond the part $e$ and to round them off at these ends. I exclude the wind from the axial vacancy in the stem $e$ most efficiently by means of a cone *i* in the flaring part of the funnel and pointing in the direction away from the exit *f*. This cone also serves to direct the wind into the channels formed between the blades. The axial space may, however, be blocked up for convenience of construction, since in that case the inner edges of the blades *g h* may be fixed upon a central core or plug, which is thereafter inserted into the part *e*, but this involves a slight loss of efficiency in average cases.

The rotary part of the cowl or hood is mounted upon the center spindle *k* and has its lower edge dipping into the annular channel *m*, which is supplied with a non-volatile fluid, such as petroleum-oil or mercury, so as to prevent admission of air through the joint. The cyclonic motion of the air as it leaves the stem *e* creates a suction on the chimney or flue which is most effective when acting in the lower half of the cowl, hence the location of the axis of the attachment below that of the cowl.

What I claim as my invention, and desire to secure by Letters Patent, is—

1. In a ventilating cowl or hood, an attachment consisting of a funnel having a tubular axial stem, the axis of which is arranged horizontally below the axis of the exit of the cowl, said stem having inwardly-projecting blades, and means for directing the wind into the spaces between the blades, as set forth.

2. In a ventilating cowl or hood, an attachment consisting of a funnel having a tubular axial stem, the axis of which is arranged horizontally below the axis of the exit of the cowl, said stem having inwardly-projecting blades, some of which are longitudinally curved.

3. In a ventilating cowl or hood, an attachment consisting of a tube having inwardly-projecting blades extending only part way to the axis of the tube, in combination with means for directing the wind into the spaces between the blades, substantially as described.

4. In a ventilating cowl or hood, an attachment consisting of a funnel having an axial tubular stem provided with a plurality of inwardly-projecting blades some of which are curved longitudinally and others straight and means for directing wind into the channels between the blades.

In testimony whereof I have signed my name to this specification in the presence of two subscribing witnesses.

ARTHUR ASHWORTH.

Witnesses:
WILLIAM E. KEYS,
GEORG NOHL.